United States Patent
Toms et al.

(10) Patent No.: US 6,336,690 B2
(45) Date of Patent: Jan. 8, 2002

(54) TRACK TENSIONING APPARATUS

(75) Inventors: Robert D. Toms, Sycamore; Sean C. McGinnis, DeKalb, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/335,399

(22) Filed: Jun. 17, 1999

(51) Int. Cl.[7] .............................................. B62D 55/14
(52) U.S. Cl. ...................................... 305/145; 305/144
(58) Field of Search ................................ 305/143, 144, 305/145, 146, 149, 148

(56) References Cited

U.S. PATENT DOCUMENTS

| | | | |
|---|---|---|---|
| 3,254,738 A | | 6/1966 | Larsen ........................ 180/9.2 |
| 3,310,127 A | | 3/1967 | Siber et al. ................... 180/9.2 |
| 3,910,649 A | | 10/1975 | Roskaft ........................ 305/10 |
| 3,972,569 A | | 8/1976 | Bricknell ...................... 305/10 |
| 4,149,757 A | * | 4/1979 | Meisel, Jr. .................... 305/145 |
| 4,227,748 A | | 10/1980 | Meisel, Jr. .................... 305/10 |
| 4,458,954 A | * | 7/1984 | Haas .......................... 305/144 |
| 4,681,376 A | * | 7/1987 | Riml .......................... 305/146 |
| 4,826,260 A | * | 5/1989 | Plourde ....................... 305/120 |
| 5,334,106 A | * | 8/1994 | Purcell ........................ 305/145 |
| 5,378,204 A | | 1/1995 | Urvoy |
| 5,452,949 A | * | 9/1995 | Kelderman ................. 305/129 |
| 5,533,587 A | | 7/1996 | Dow et al. ................... 180/235 |
| 5,738,421 A | | 4/1998 | Neymans et al. ........... 305/144 |
| 5,984,436 A | * | 11/1999 | Hall ........................... 305/145 |
| 6,024,183 A | * | 2/2000 | Dietz et al. .................. 180/9.1 |
| 6,027,185 A | * | 2/2000 | Crabb ......................... 305/148 |
| 6,106,082 A | * | 8/2000 | Gustin ........................ 305/145 |

FOREIGN PATENT DOCUMENTS

| | | |
|---|---|---|
| GB | 1 434 440 | 5/1976 |
| GB | 2 345 042 A | 6/2000 |

\* cited by examiner

*Primary Examiner*—S. Joseph Morano
*Assistant Examiner*—Long Bae Nguyen
(74) *Attorney, Agent, or Firm*—Jeff A. Greene

(57) ABSTRACT

Endless rubber track laying machines are provided with a pair of track laying assemblies positioned on opposite sides of the work machine. Each track laying assembly includes an endless rubber belt entrained around a drive wheel, an idler wheel, and a plurality of supporting mid-rollers. A fluid cylinder is connected to the idler wheel for tensioning the endless rubber belts. The present recoil activated valve includes a two position poppet valve positioned between the fluid cylinder and an accumulator. With this recoil activated valve the tensioning system locks the fluid cylinder as the work machine traverses side slopes. Thus, a simple system is provided that can be solely fluid actuated or actuated by an electronic monitoring system, thereby providing a system that reduces the possibility of the endless rubber track from un-tracking.

17 Claims, 2 Drawing Sheets

TRACK TENSIONING APPARATUS

DESCRIPTION

1. Technical Field

This invention relates generally to an apparatus for tensioning track on an endless track laying work machine and more particularly to a tensioning apparatus that reduces the possibility of un-tracking.

2. Background Art

Present day endless track laying work machines utilize a propulsion system in which a continuous flexible rubber belt is frictionally driven as it is entrained about a pair of wheels. Problems encountered in actually reducing such an endless track laying work machine to practice include how to maintain adequate tension on such belt around the entrained wheels, and keeping the belt in lateral alignment with the wheels when the wheels are subject to large lateral loads. Other problems are maintaining the structural integrity and providing long life for the belt, supporting mid-rollers, drive wheels, and idler wheels.

Large lateral loads occur when the endless track laying work machine traverses side slopes. When such side slopes are encountered the weight of the work machine pulls laterally against the belts. If the side slope is steep enough or if debris such as mud or crop residue becomes trapped between the idler wheel and the belt while traversing the side slope, the possibility of throwing a belt increases.

The present invention is directed to overcome one or more of the problems as set forth above.

DISCLOSURE OF THE INVENTION

In one aspect of the invention a track tensioning system includes an idler wheel that is in contact with an inner surface of an endless track. A fluid cylinder is mechanically coupled with the idler wheel. An accumulator is positioned in fluid communication with the fluid cylinder. A recoil activated valve is positioned in fluid communication with the fluid cylinder and the accumulator.

In another aspect of the invention a track roller assembly includes an endless track and an idler wheel positioned in contact with said endless track. A fluid cylinder has an actuator rod that is connected with the idler wheel. An accumulator is positioned in fluid communication with said fluid cylinder and a recoil activated valve is interposed the fluid cylinder and the accumulator.

BEST MODE FOR CARRYING OUT THE INVENTION

Figure 1:
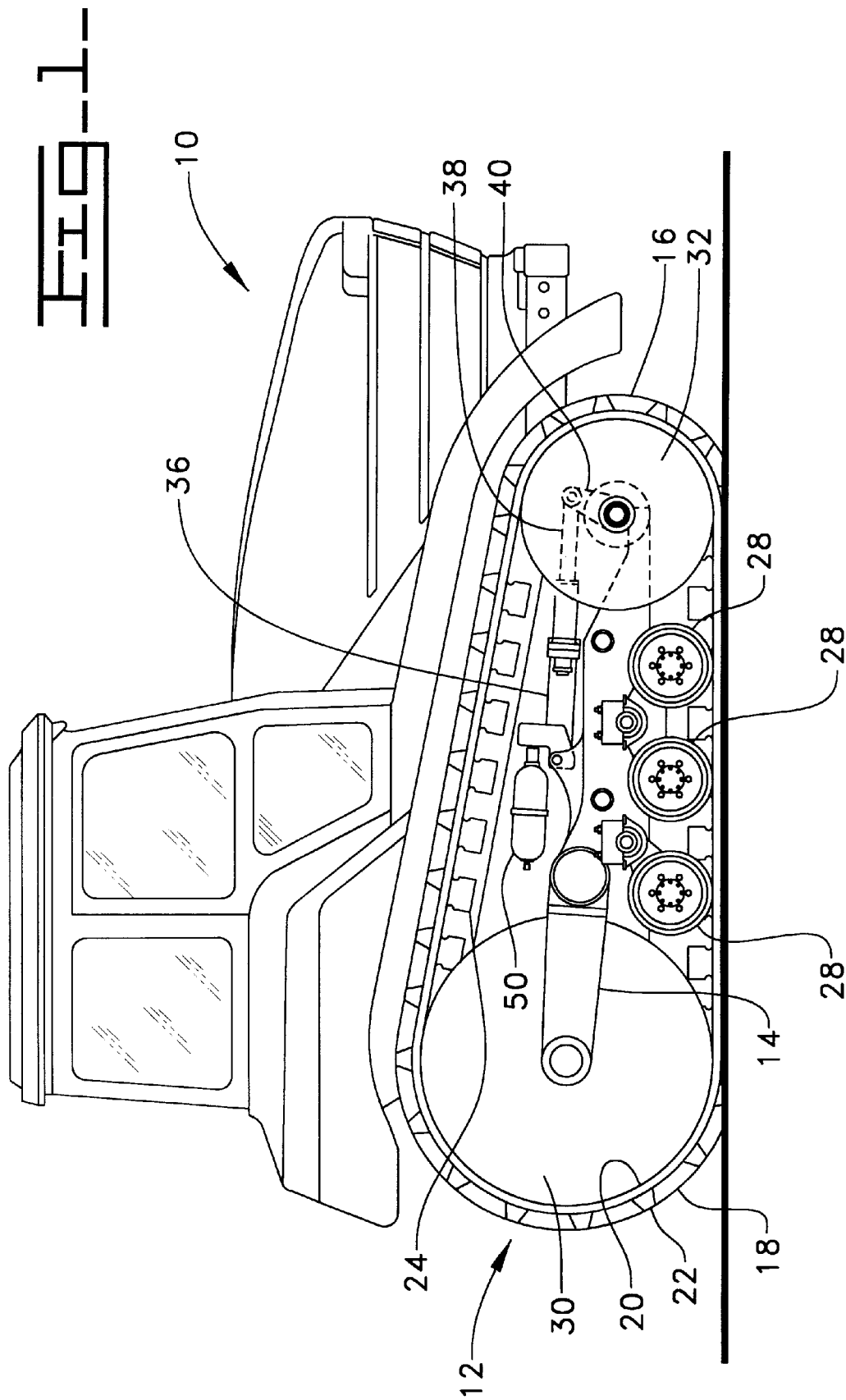
FIG. 1 is a side elevational view of a work machine embodying the present invention.

Referring to FIG. 1, a work machine 10, for example, is an agricultural tractor having a pair of track roller assemblies 12, only one shown, one positioned on each side of the work machine 10. Each track roller assembly 12 includes a roller frame 14 and utilizes an endless track 16 that is an inextensible endless rubber belt 18. The endless rubber belt 18 defines an inner surface 20, and a ground contacting or outer surface 22. Positioned on the inner surface 20 and centrally located around the inner circumference thereof is a plurality of guide blocks 24. Each endless rubber belt 18 is entrained around a plurality of supporting mid rollers 28, a drive wheel 30 and an idler wheel 32. The drive wheel 30 and the idler wheel 32 are rotatably connected to the roller frame 14 at opposite ends from one another. The work machine 10, for example, positions the drive wheel 30 near the back and the idler wheel 32 toward the front in relation to a direction of travel. In as much as the track roller assemblies 12 are substantially structurally and operatively similar, further reference will be made to only a single side of the work machine 10.

In this example, an engine (not shown) powers the drive wheel 30, in a conventional manner, and frictionally drives each of the endless rubber belts 18. The idler wheel 32 is in contact with the inner surface 20 and maintains tension on the endless rubber belt 18 so as to prevent the endless rubber belt 18 from derailing or slipping over the drive wheel 30. In particular, the idler wheel 32 is coupled to a track tensioning system 26 that includes a fluid cylinder 34 that urges the idler wheel 32 towards and away from drive wheel 30.

FIG. 1 further shows the relationship between the idler wheel 32 and the fluid cylinder 34. The fluid cylinder 34 includes a housing 36 and an actuator rod 38. The housing 36 is pivotally connected to the roller frame 14 of the work machine 10. The actuator rod 38 is pivotally connected to one end of a swing link 40. Swing link 40 is pivotally connected to the roller frame 14 in a conventional manner as by pin.

The idler wheel 32 is rotatably connected to a middle portion of the swing link 40. Hence, the swing link 40 and therefore the idler wheel 32 is urged away from the drive wheel 30 when the actuator rod 38 is extended out of the housing 36, hence placing a predetermined amount of tension on the endless rubber belt 18. Similarly, the swing link 40 and therefore the idler wheel 32 is urged towards the drive wheel 30 when the actuator rod 38 is retracted into the housing 36, relieving the tension on the endless rubber belt 18.

Figure 2:
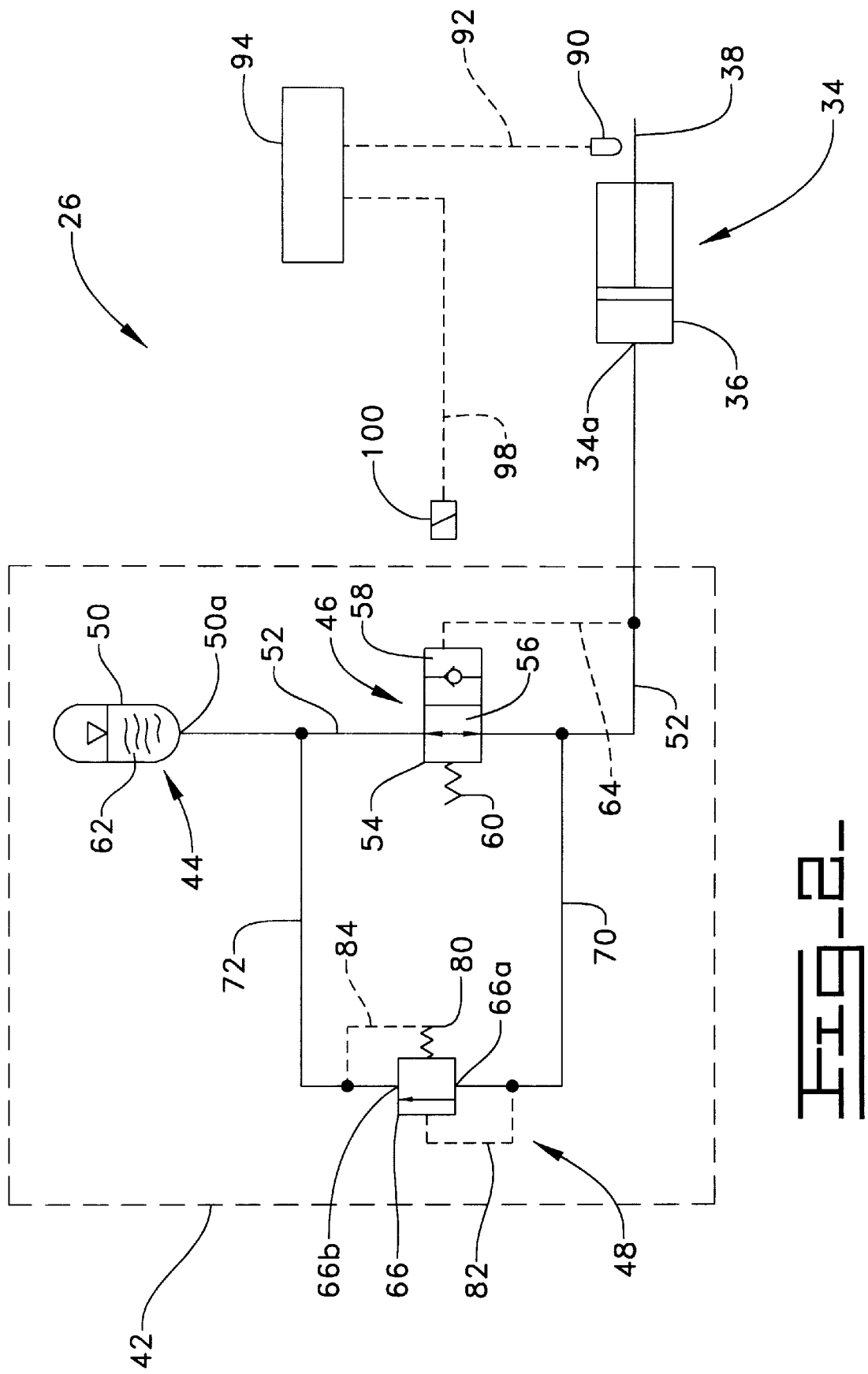
FIG. 2 is a schematic view of a fluid circuit of the track tensioning arrangement of the work machine in FIG. 1.

Referring now to FIG. 2, the fluid cylinder 34 is shown in fluid communication with a fluid circuit 42. The fluid circuit 42 is a self-contained system that includes a recoil apparatus 44, a recoil activated valve 46, and a pressure-regulating valve 48. What is meant by a self-contained system is that once the system is charged with an operation fluid 62 it is free from connection to a source of the operation fluid 62 (fluid pump). The fluid circuit 42 is pre-charged with the operation fluid 62, such as oil, to a predetermined pressure setting for example 2700 psi/186 bar.

The recoil apparatus 44 is for example an accumulator 50 that is in fluid communication with the fluid cylinder 34. However it should be understood that the recoil apparatus could also be a pressure relief valve that would drain fluid to a reservoir in a system that is connected to a source of operation fluid 62, a spring mechanism, or any known structure for allowing recoil of a tensioning cylinder. The accumulator 50 includes a bladder (not shown) with a compressed gas such as nitrogen therein. The gas exerts pressure on the operation fluid 62 within the accumulator 50 thereby urging the operation fluid 62 into the conduit 52.

The recoil activated valve 46 is connected to fluid conduit 52 interposed an inlet port 50a of the accumulator 50 and a head end port 34a of the fluid cylinder 34. The recoil activated valve 46 is for example a two way poppet valve 54 with a first position 56 that is normally open and a second position 58 that checks the flow of fluid from the cylinder 34 to the accumulator 50. It should be understood that the recoil activated valve 46 could any hydraulic valve that checks the flow of fluid to the accumulator 50. The poppet valve 54 is held in the first position 56 by a biasing force created by a fixed spring 60 corresponding to a fixed setting, for example of 3000 psi/207 bar. While the spring 60 in this example is shown having a fixed rate, it should be understood that a variable spring could be used.

A pilot signal line 64 is connected to conduit 52 between the fluid cylinder 34 and the poppet valve 54. The biasing force of the spring 60 is overcome when a given fluid pressure, for example 3000 psi/207 bar, or above is present in the pilot signal input line 64 thereby moving the poppet valve 54 into the second position 58 and checking the flow of fluid to the accumulator 50.

The pressure-regulating valve 48 is preferably a pilot-activated pressure relief valve 66 that is connected in parallel with the poppet valve 54. In particular, a fluid conduit 70 connects an inlet port 66a of the pressure relief valve 66 to fluid conduit 52 between the poppet valve 54 and the fluid cylinder 34. A fluid conduit 72 couples an outlet port 66b of the pressure relief valve 66 to fluid conduit 52 between the poppet valve 54 and the accumulator 50. Pressure relief valve 66 includes a spring 80 that exerts a biasing force corresponding to a fixed pressure setting of, for example 2000 psi/138 bar. While the spring 80 in this example is shown having a fixed rate, it should be understood that a variable spring could be used.

A pilot signal line 82 opposing the biasing force of spring 80 is connected to fluid conduit 70. Additionally a pilot signal line 84 cooperating with the biasing force of spring 80 is connected to fluid conduit 72. Pressure relief valve 66 is held in a normally closed position when the pressure difference between the pressure in the fluid cylinder 34 and the pressure in the accumulator 50 is less than 2000 psi/138 bar. The pressure relief valve 66 shifts to an open position when the pressure in the fluid cylinder 34 is for example 5000 psi/345 bar thus overcoming the sum of the biasing force of the spring 80 and the pressure in the accumulator 50.

In an alternative embodiment, a position sensor 90 could be used to measure movement of the actuator rod 38 of fluid cylinder 34. The position sensor 90 is connected via an electrical conductor 92 to a controller 94. The controller 94 would monitor the movement of the actuator rod 38 during normal operation. If the actuator rod 38 retracts more than a predetermined amount, for example 0.75 in/19.05 mm, the controller 94 would send an electrical signal through an electrical conductor 98, to a solenoid 100. Solenoid 100 is connected to poppet valve 54 in place of the pilot signal line 64, to move the poppet valve 54 to the second position 58 responsive to an electrical signal rather than a predetermined pressure.

Industrial Applicability

As the work machine 10 travels across different terrain it encounters irregularities such as furrows, hills and side slopes. The irregularities of the terrain, manufacturing imperfections such as the drive wheel 30 or idler wheel 32 being out of round and debris ingestion between the drive wheel 30 or idler wheel 32 and the endless rubber belt 18 create variations in tension forces. These forces are imputed into the endless rubber belt 18 as it rotates around the drive wheel 30, the idler wheel 32, and the supporting mid-rollers 28. The forces that are imputed into the endless rubber belt 18 exert force on the idler wheel 32 and push against the actuator rod 38. The forces that are applied to the actuator rod 38 cause a dithering effect and move fluid in and out of the fluid cylinder 34 and the accumulator 50. This movement of the fluid cylinder 34 is normal and is generally referred to as recoil and is accommodated by the accumulator 50.

However, when the work machine 10 travels along a steep side slope the tension in the endless belt 18 can increase beyond normal recoil levels. While traversing steep side slopes the endless rubber belt 18 shifts to one side, pulling against the idler wheel 32. This again causes the swing link 40 to pivot rearward about the connection point between the swing link 40 and the roller frame 18. The rearward pivotal movement of the swing link 40 pushes against the actuator rod 38 of the fluid cylinder 34. The pressure within the housing 36 increases and is transmitted through the pilot signal line 64 to the poppet valve 54. If the pressure in the accumulator 50 and the fluid cylinder 34 increases beyond the biasing force of the spring 60, the poppet valve 54 shifts to the second position 58 thereby checking the flow of the operation fluid 62 to the accumulator 50. With the poppet valve 54 in the second position 58 and the flow of operation fluid 62 from the fluid cylinder 34 to the accumulator 50 is blocked. This prevents further retraction of actuator rod 38 into the fluid cylinder 34 which would in turn increase tension on the endless rubber belt 18, thus reducing the possibility of the endless rubber belt 18 becoming untracked.

If additional force is exerted on the endless rubber belt 18, the pressure in the fluid cylinder 34 will continue to increase and be transmitted through the pilot signal line 82. If the pressure exceeds the biasing force of the spring 80, the pressure relief valve 66 shifts from the normally closed position thereby allowing additional flow of fluid to the accumulator 50. In this arrangement the pressure relief valve 66 acts to regulate the pressure in the fluid cylinder 34 so as not to exceed a maximum pressure, reducing the risk of damage thereto.

In the aforementioned alternative embodiment, the position sensor 90 monitors the position of the actuator rod 38 of the fluid cylinder 34. If the actuator rod 38 is forced to retract more than a predetermined amount the controller 94 sends a signal through the electrical conductor 98 to solenoid 100. Solenoid 100 would overcome the biasing force of the spring 60 moving the poppet valve 54 to the second position 58 blocking the flow of fluid from the fluid cylinder 34. With the fluid cylinder 34 prevented from further retraction the idler wheel 32 limits the amount the belt can move laterally, reducing the possibility of the endless rubber belt 18 becoming untracked.

After the work machine 10 returns to even ground the force exerted on the actuator rod 38 is relieved due to the endless rubber belt 18 returning to a normal operating position. This reduces the pressure in the fluid cylinder 34 and the pilot signal line 64 to the initial predetermined pressure setting thus, allowing the poppet valve 54 to return to the first position 56. With the poppet valve 54 back in the first position 56 fluid can return from the accumulator 50 to the fluid cylinder 34.

What is claimed is:

1. A track tensioning system (26) comprising:
    an idler wheel (32) being in contact with an inner surface (20) of an endless track (16);
    a fluid cylinder (34) mechanically coupled with said idler wheel (32);
    an accumulator (50) in fluid communication with said fluid cylinder (34); and
    a recoil activated valve (46) in fluid communication with and positioned between said fluid cylinder (34) and said accumulator (50) and automatically operatively blocks communication to said accumulator (50) in response to recoil.

2. The track tensioning system (26) of claim 1, wherein said recoil activated valve (46) includes:

a two way poppet valve (54) having (i) a first position (56) providing fluid flow from said fluid cylinder to said accumulator (50) and (ii) a second position (58) checking the flow of fluid from said fluid cylinder (34) to said accumulator (50).

3. The track tensioning system (26) of claim 2, wherein said poppet valve (54) is pilot actuated.

4. The track tensioning system of claim 2, wherein said poppet valve (54) includes a solenoid (100) for actuating said poppet valve (54).

5. The track tensioning system (26) of claim 4, further including a positioning sensor (90) that measures the position of an actuator rod (36) of said fluid cylinder (34), wherein retraction of said actuator rod (36) beyond a predetermined amount would cause a controller (94) to send an electronic signal to said solenoid (100).

6. The track tensioning system (26) of claim 1, wherein said idler wheel (32) includes:
   a swing link (40) pivotally connected with said fluid cylinder (34); and
   said swing link (40) is connected with said idler wheel (32).

7. The track tensioning system (26) of claim 1, wherein said endless track (16) is an inextensible endless rubber belt (18).

8. The track tensioning system (26) of claim 1, further including a pressure regulating valve (48) being connected in parallel with said recoil activated valve (46).

9. A track roller assembly (12), comprising:
   an endless track (16);
   a track roller frame (14);
   a drive wheel (30) being rotatably connected to said roller frame (14);
   an idler wheel (32) being rotatably connected with said roller frame (14) and positioned in contact with said endless track (16);
   a fluid cylinder (34) having an actuator rod (36), said actuator rod (36) being connected with said idler wheel (32);
   an accumulator (50) in fluid communication with said fluid cylinder (34); and
   a recoil activated valve (46) being in fluid communication with and interposed said fluid cylinder (34) and said accumulator (50) and automatically operatively blocks communication to said accumulator (50) in response to a one of a predetermined pressure in said fluid cylinder (34) and predetermined movement of said idler wheel (32).

10. The track roller assembly (12) of claim 9, wherein said recoil activated valve (46) includes:
    a two way poppet valve (54) having (i) a first position (56) providing fluid flow from said fluid cylinder (34) to said accumulator (50) and (ii) a second position (58) checking the flow of fluid from said fluid cylinder (34) to said accumulator (50).

11. The track roller assembly (12) of claim 10, wherein said two way poppet valve (54) is pilot actuated.

12. The track roller assembly (12) of claim 10, wherein said two way poppet valve (54) includes a solenoid (100) for actuating said two way poppet valve (54).

13. The track roller assembly (12) of claim 12, further including a positioning sensor (98) that measures the position of an actuator rod (36) of said fluid cylinder (34), wherein retraction of said actuator rod (36) beyond a predetermined amount would cause a controller (94) to send an electronic signal to said solenoid (100).

14. The track roller assembly (12) of claim 9, wherein said endless track (16) is an inextensible endless rubber belt (18).

15. The track roller assembly (12) of claim 9, further including a pressure regulating valve (48), wherein;
    said pressure regulating valve (48) has a fluid obstructing position and a fluid transmitting position, said fluid transmitting position being dependent on the pressure in said fluid cylinder (34),
    an operation fluid (62) is transmitted from said fluid cylinder (34) to said accumulator (50) when said recoil activated valve (46) is in said second position (58) and said pressure regulating valve (48) is in said fluid transmitting position.

16. The track roller assembly (12) of claim 15, wherein said pressure regulating valve (48) is connected in parallel with said recoil activated valve (46).

17. The track roller assembly (12) of claim 15, wherein:
    said pressure regulating valve (48) includes a pilot signal input line (82),
    said pressure regulating valve (48) is positioned in said fluid obstructing position when said pilot signal input line (82) possess a first pressure value, and
    said pressure regulating valve (48) is positioned in said fluid transmitting position when said pilot signal input (82) line possess a second pressure value.

\* \* \* \* \*